United States Patent [19]

Underhill

[11] 4,288,969
[45] Sep. 15, 1981

[54] STONE TRAP SEAL
[75] Inventor: Kenneth R. Underhill, Strasburg, Pa.
[73] Assignee: Sperry Corporation, New Holland, Pa.
[21] Appl. No.: 135,841
[22] Filed: Mar. 31, 1980
[51] Int. Cl.³ .............................................. A01F 12/10
[52] U.S. Cl. ..................................... 56/10.2; 49/475; 130/27 JT
[58] Field of Search .................. 56/10.2, DIG. 15; 130/27 JT, 27 S, 27 R; 49/91, 92, 475

[56] References Cited
U.S. PATENT DOCUMENTS

| | | | |
|---|---|---|---|
| 2,890,503 | 6/1959 | Paine | 49/91 |
| 3,576,188 | 4/1971 | Tanis | 130/27 JT |
| 3,643,666 | 2/1972 | Denison | 130/27 JT |
| 3,675,660 | 7/1972 | Girodat | 130/27 JT |
| 3,756,248 | 9/1973 | Mathews | 130/27 JT |
| 3,971,390 | 7/1976 | McDuffie et al. | 130/27 JT |
| 4,146,038 | 3/1979 | De Busscher | 130/27 JT |

Primary Examiner—Jay N. Eskovitz
Attorney, Agent, or Firm—Larry W. Miller; Frank A. Seemar

[57] ABSTRACT

In a combine used for harvesting and threshing crop material from a field and equipped with a system for ejecting stones and other foreign objects from an infeed housing through a trapdoor there is provided an improved seal for the stone trapdoor and the opposing sidewalls of the infeed housing.

5 Claims, 3 Drawing Figures

STONE TRAP SEAL

BACKGROUND OF INVENTION

This invention relates generally to crop harvesting and threshing machines, more commonly known as combines, and more particularly to the trapdoor area in the infeed housing wherein stones and other foreign non-crop objects are ejected from the infeed housing prior to their entering the threshing and separating apparatus of the combine. Specifically, the invention is concerned with the seal that exists between the sidewalls of the infeed housing and the trapdoor to prevent the loss of crop material which might fall therebetween during the normal field operations of the combine.

In the prior conventional types of combines, stone traps were routinely provided to separate out large hard objects or stones that generally were greater than three or four inches in size. The stone traps provided in the conventional combines were utilized generally in two types of stone ejecting systems. The passive type of stone ejecting system employed a stone trap with a space or gap between the top of the crop elevator or conveyor within the infeed housing and the base unit threshing apparatus. In this type of an ejecting system hard objects or stones were conveyed upwardly along with the crop material from the header through the infeed housing towards the threshing apparatus. When the crop material passed over the gap, stones by their very weight would fall down through the gap into the stone trap. Those stones that were carried along with the crop material past the stone trap were passed into contact with the threshing cylinder, which generally was rotatably mounted transversely to the longitudinal axis of the combine. If the hard objects or stones were of sufficient size so that they would not easily pass between the threshing cylinder and the threshing concaves, they would be thrown backwardly by the rotation of the cylinder into the gap or space. Thus, this particular cooperation between the threshing cylinder and the stone trap created an almost natural stone ejecting system for conventional combines. Even if a stone did pass into the threshing cylinder it made only one pass about the cylinder and across the underlying concave, usually doing minimal damage to the threshing apparatus before it was passed through and ejected from the combine.

The second type of stone ejecting system generally employed an active system which utilized some sort of a detecting system to detect the presence of a stone or other non-frangible object. Typically an electronic sensor, such as an acoustic transducer usually in the form of a piezoelectric disc, is mounted in a sensing plate and is used in conjunction with a stone trap. The electronic sensor responded to the characteristics of the sound, such as the amplitude and frequency, that an impacting stone generated in the sensing bar. This signal would then be transferred through an electronic circuit that filtered out the range within which the amplitude and frequency was characteristic of stones. Within this characteristic spectral range the electronic circuit automatically activated a latch releasing mechanism on a door along the bottom of the infeed housing that would pivot open to permit the stones or hard objects to be ejected from the feeder house, along with a small amount of crop material.

An alternate type of active stone ejecting system utilized a pinch roll rotatably mounted in the infeed housing at a predetermined distance above the trapdoor. When a stone of sufficient size was carried by the crop elevator between the pinch roll and the trapdoor into compressive engagement therewith, the rotation of the pinch roll exerted a downward force through the stone against the trapdoor. The trapdoor was spring loaded closed so that above a predetermined pressure the door would be forced open, thereby causing the stone to be directed downwardly and out of the infeed housing through the opening created by the opened trapdoor.

Of those type of active stone ejecting systems which utilize a door or opening in the infeed housing to allow stones or other foreign objects to pass therethrough, normally some type of a sealing material is used between the door and the bottom surface of the infeed housing to prevent the loss of crop material which can escape therebetween. Early attempts to utilize a trapdoor type of structure without any sealing material resulted in unacceptable losses of crop material as it escaped through the space between the edges of the trapdoor and infeed housing. When sealing materials were utilized between the edges of the trapdoor and the opposing sidewalls of the infeed housing to eliminate this loss they were found to be generally acceptable, but were typically composed of a pliant material such as rubber. After extended periods of use this pliant sealing material would crack or become torn, thereby permitting crop material once again to escape at the damaged area, in addition to necessitating periodic replacement. The periodic replacement of the sealing material obviously added additional costs and utilized additional time to maintain the combine in its proper operational condition.

The foregoing problems are solved in the design of the combine infeed housing comprising the present invention by providing an improved seal for the stone trapdoor and the opposing sidewalls of the infeed housing which is formed directly into the opposing sidewalls.

BRIEF DESCRIPTION OF THE DRAWINGS

The features and advantages of this invention will become apparent upon consideration of the following detailed disclosure of the invention, especially when it is taken in conjunction with the accompanying drawings wherein.

SUMMARY OF THE INVENTION

It is a principal object of the present invention to provide in an infeed housing for a combine an improved seal between the sidewalls of the infeed housing and the trapdoor that will substantially decrease the amount of crop material that is lost therebetween when the trapdoor is in the closed position.

It is another object of this invention to provide an improved sealing means in the infeed housing for a trapdoor that will not easily wear out or become damaged to permit crop material to pass therebetween.

It is a feature of the present invention that there is an indentation of predetermined radius made in each of the interior sides of the opposing sidewalls of the infeed housing which cooperate with the curvature of the edges of the trapdoor when the door is closed to form an effective seal against the loss of crop material.

It is an advantage of the present invention that there is no rubber or other pliant material necessary to form the seal which can easily wear out with use or exposure to the elements.

It is another advantage that the seal is an intregal part of the infeed housing formed into each sidewall.

It is a further advantage that upon closing the trapdoor to its fully raised position the trapdoor and the indentations in the sidewalls of the infeed housing form an effective seal against the loss of crop material.

These and other objects, features and advantages are obtained by providing in a combine an improved seal for the stone trapdoor and the opposing sidewalls of the infeed housing.

DETAILED DESCRIPTION OF THE PREFERRED EMBODIMENT

Figure 1:
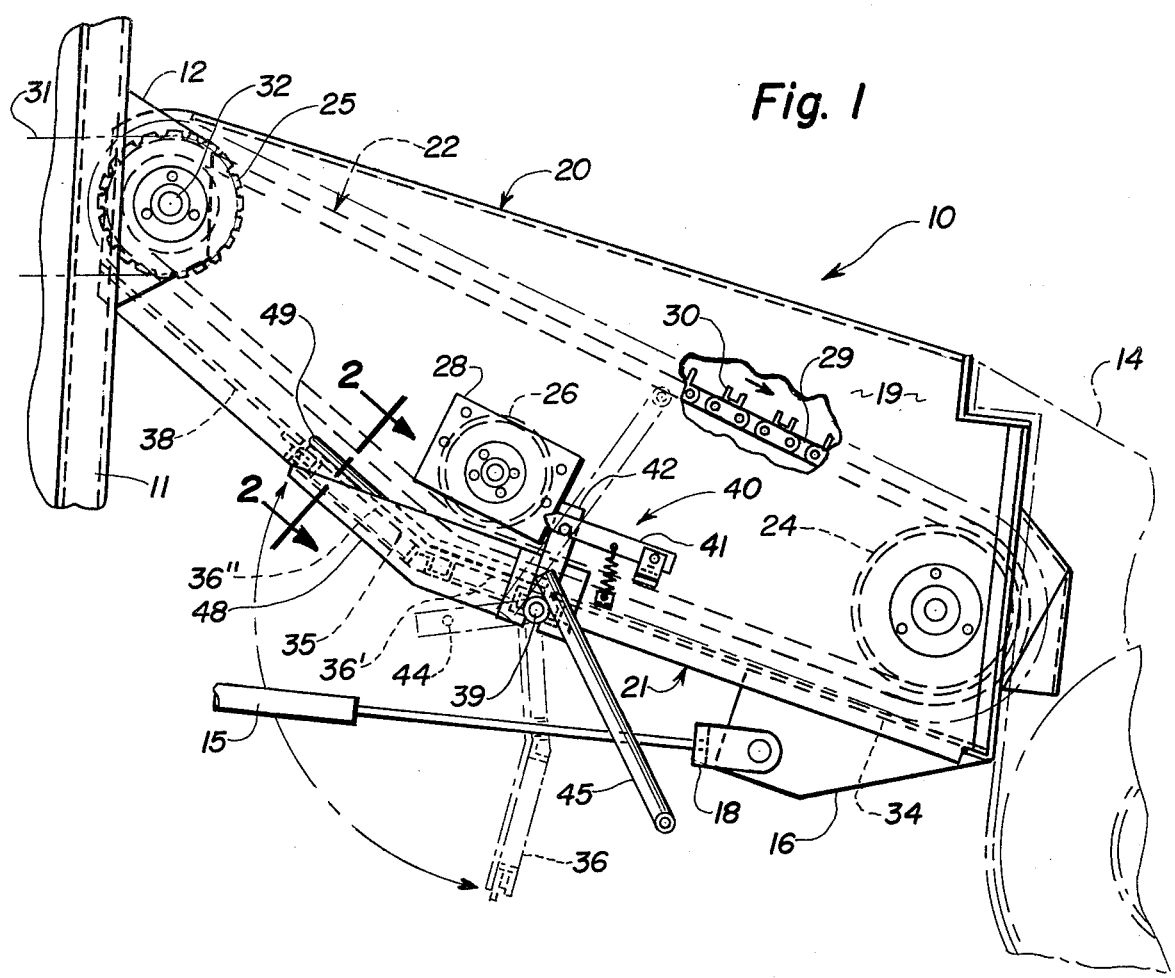
FIG. 1 is a side elevational view of an infeed housing of a combine with a portion broken away to show a portion of the crop elevator.

Referring to FIG. 1 there is shown an infeed housing 10 in side elevational view. The infeed housing 10 is moveably affixed to the main frame of the combine via a vertical support beam 11. The infeed housing 10 is affixed to the support beam 11 via a pivotable mounting 12 within which the housing is hinged. The infeed housing 10 has attached to its forward most portion a header, indicated generally by the numeral 14, which is raised and lowered with the infeed housing about the pivot point in mounting 12 by a pair of hydraulic cylinders 15, only one of which is shown. The hydraulic cylinder 15 is appropriately mounted to mounting bracket 16 by coupling 18. On their opposing ends (not shown) hydraulic cylinders 15 are suitably fastened to the main frame of the combine.

The infeed housing 10 further comprises a pair of opposing sidewalls 19, only one of which is shown, which serve to connect and support a top surface 20 and a bottom surface 21. The infeed housing 10 has a crop elevator, indicated generally by the numeral 22, that is moveably mounted about a front guide drum 24 and a rear driving drum 25. Pinch roll 26 further serves to guide the crop elevator 22 and is appropriately mounted for rotation in mounting 28 to the sidewalls 19 of the infeed housing 10. The crop elevator 22 comprises generally three spaced apart chains 29, only one of which is shown partially in FIG. 1, interconnected by a plurality of U-shaped slats 30. The two outside chains 29 generally pass about sprockets on the opposing ends of the shafts which pass through the driven front guide drum 24 and the rear driving guide drum 25.

The crop elevator 22 is driven in a clockwise direction as seen in FIG. 1, by the drive means 31 which transfers rotary power from the base unit of the combine. Drive means 31, typically in the form of chains or belts cooperate with sprockets or sheaves, respectively, transfer the rotary power to the shaft 32, thereby imparting a driving force to the drum 25 within which it is mounted. This clockwise direction of movement of the crop elevator 22 serves to carry the crop material from the header 14 upwardly and rearwardly along its predetermined path of travel towards the threshing and separating apparatus in the base unit of the combine, not shown. The infeed housing 10 has an opening in its forward portion adjacent the header between the sidewalls 19 which permit the crop material that has been collected from the field to be transferred by the header into the infeed housing 10. Similarly, at its rear the infeed housing 10 has an appropriate opening to permit the crop material to be passed into the threshing and separating apparatus of the combine.

The bottom surface 21 of the infeed housing 10 is comprised of two major portions with distinct sections therein. Across the front of the infeed housing there is an initial section 34 that receives the crop material as it passes from the header into the infeed housing 10. This initial section 34 establishes the path of travel of the crop material along the bottom surface 21. Section 34 of the bottom surface 21 of the infeed housing 10 terminates in the initial portion 36' of the trapdoor 36.

The second portion 35 of the infeed housing 10 commences generally midway along a pivotally mounted trapdoor 36 and forms a surface that is angled generally obliquely to the predetermined path of travel established by first section 34 and initial portion 36' of the trapdoor 36 of the bottom surface 21. This upward angularization of the trapdoor 36 occurs at a predetermined point in its length where the flow path of the crop material as it passes along the first section 34 of the bottom surface 21 and initial portion 36' is changed. This upwardly or obliquely inclined portion of the trapdoor 36, indicated by the numeral 36", defines the path which the crop material will follow as it is conveyed by the crop elevator 22 upwardly through the second portion 35 of the infeed housing 10 into the threshing and separating apparatus of the combine. The obliquely and upwardly inclined portion 36" of the trapdoor 36 also is the starting point for the second portion 35 of the infeed housing bottom surface 21.

The last section of the second portion 35 of the infeed housing bottom surface 21 comprises a section 38 which continues in the upwardly extending direction along the same general axis as that established by the obliquely and upwardly inclined portion 36" of the trapdoor 36. Thus, the floor of the bottom surface 21 of the infeed housing 10 establishes and defines a flow path for the crop material in conjunction with the crop elevator 22 that serves to convey the crop material from the header 14 upwardly into the threshing and separating apparatus of the combine.

The trapdoor 36 is hingedly mounted at location 39 to the underside of section 34. An appropriate latching mechanism, indicated generally by the numeral 40, serves selectively to retain the trapdoor 36 in the closed position during operation. Latching mechanism 40 typically includes a pivotally mounted spring biased retaining arm 41 which cooperates with the pivotable latch link 42 that is rotatably fastened to the rotatable shaft at location 39. Latch link 42 has a locking tab 44 that inserts within an appropriately sized notch within retaining arm 41. Upon the raising of retaining arm 41, such as by a solenoid actuated plunger (not shown) in response to the actuation of an object detecting means (not shown) such as for stones the pivotable latch link 42 is free to pivot with trapdoor 36 from the fully raised or closed position to the fully lowered or open position shown in phantom lines FIG. 1. A trapdoor handle 45 is appropriately fastened to the trapdoor 36 to permit an operator to manually raise the trapdoor 36 from the fully opened position to the closed position to resume operations.

Figure 2:
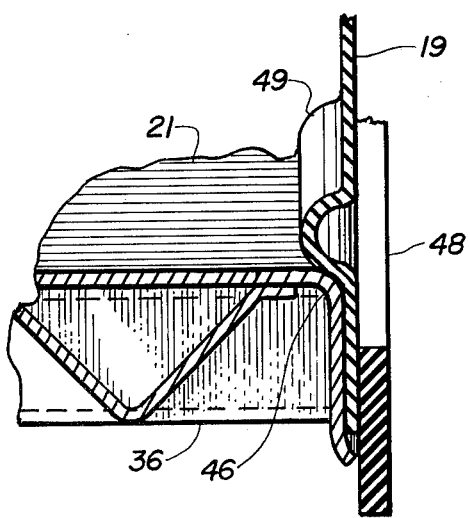
FIG. 2 is a sectional view taken along the lines 2—2 of FIG. 1 showing the seal contained between one of the sidewalls of the infeed housing and the trapdoor when the door is in the closed position.
Figure 3:
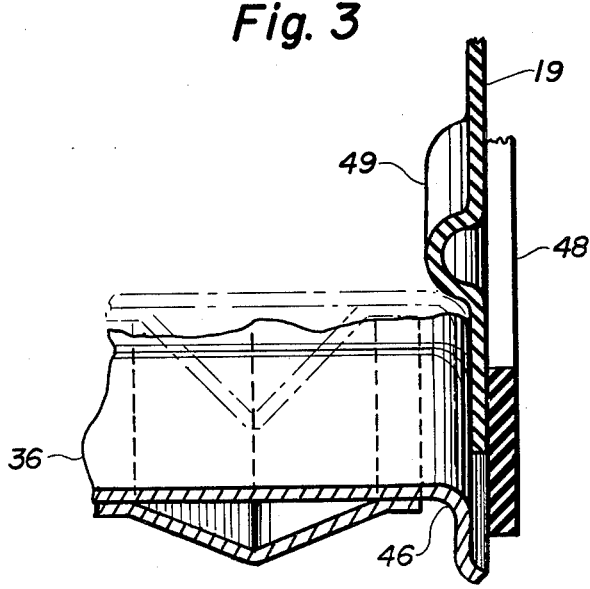
FIG. 3 is a partial end view showing the trapdoor as it opens downwardly away from the seal in one of the sidewalls of the infeed housing.

As best seen in FIGS. 2 and 3 the trapdoor 36 is curved at its edges about a predetermined radius so that its edges 46, only one of which is shown, are rounded. A support plate 48, mounted exteriorly to each of the sidewalls 19, serves to reinforce the sidewalls 19 in the area of the trapdoor 36. Each of the sidewalls 19 has an indentation 49 formed thereinto of predetermined radius. When the trapdoor 36 is in the fully raised or closed position its curved or rounded edge 46 seats firmly against the outer portion of indentation 49 to form a tight fitting junction that effectively seals the interior of the infeed housing 10 along the junction where the trapdoor 36 and the indentation 49 meet.

In operation, the combine is driven across a field from which crop material is gathered by the header 14 and is directed into the infeed housing 10. Once within the infeed housing 10, the crop material is carried upwardly toward the combine by the crop elevator 22. As the crop material is gathered from the field, especially if it is lying in windrows, there is a tendency to gather other objects such as stones or pieces of metal and pass them into the infeed housing 10. The crop material and other objects upon initially entering the infeed housing pass a foreign object detector such as the type described in co-pending U.S. Patent Application Ser. No. 109,932, assigned to the assignee of the present invention. When a foreign object, such as a stone or piece of metal, is detected the foreign object detector will activate the latching mechanism 40 to release locking tab 44 on pivotable latch link 42 to permit the trapdoor 36 to fall to the fully down or open position. As the crop material with the stone or other foreign object therein is moved rearwardly by the crop elevator it continues to travel along a path generally defined by first section 34 of the bottom surface 21 of the infeed housing 10. When the crop material and the foreign objects reach the predetermined location along the trapdoor 36 where the path of travel is oblique to the initial path of travel, caused by the upward angularization of the portion 36" of the trapdoor 36 and the second portion 35 of the bottom surface 21 of the infeed housing, they pass out of the infeed housing 10. The exit from the infeed housing 10 of the crop material and the foreign objects if effected by the action of pinch roll 26 guiding the crop material and foreign objects down into the opening created when the trapdoor 36 is lowered to the fully opened position. Thus, the undesired foreign objects or stones are ejected safely from the infeed housing 10 without being ingested into the threshing and separating apparatus of the combine, thereby avoiding causing considerable damage to this apparatus.

When the trapdoor 36 is raised to the fully closed position crop material is conveyed rearwardly and upwardly along both the first portion of the bottom surface 21, defined by section 34 and portion 36' of the trapdoor 36, and the second upwardly inclined portion 35 of the infeed housing 10. An effective seal is created between the trapdoor 36 and the sidewalls 19 of the infeed housing 10 by the indentation 49 and the rounded edges 46 of the trapdoor. When the trapdoor 36 is fully closed a tight fitting that is not susceptible to wear or warping is effected between the cooperating curved surfaces of the indentation 49 and the rounded edges 46 of the trap door. Thus, crop material is continuously conveyed upwardly across the trapdoor 36 by the crop elevator 22 during uninterrupted operations without loss of crop material across the junction of the edges of the trapdoor 36 and the sidewalls 19.

While the preferred structure and principles of the present invention have been incorporated as shown and described above, it is to be understood that the invention is not to be limited to the particular details thus presented, but in fact widely different means may be employed in the scope of the broader aspects of this invention. The scope of the appended claims is intended to encompass all obvious changes in details, material and arrangement of parts which will occur to one of skill in the art upon reading of this disclosure.

Having thus described the invention what is claimed is:

1. In an infeed housing attachable on a first inlet end to a harvesting attachment and on a second outlet end to a combine having two opposing sidewalls connecting a top surface and a bottom surface thereby defining a flow passage for crop material, the bottom surface further having a trapdoor mounted thereto moveable between a first closed position and a second opened position and cooperative with the bottom surface and a foreign object detecting system to selectively create a discontinuity in the flow passage for the ejection of detected foreign objects, the improvement comprising:

sealing means formed into each of the opposing sidewalls and cooperative with the trapdoor in the closed position to prevent the loss of crop material therebetween during the operation of the combine, the sealing means further comprising an elongate indentation in each of the opposing sidewalls having an inner surface and an outer surface, the inner surface being of predetermined radius nearest the trapdoor, said trapdoor having first and second opposing edges adjacent the opposing sidewalls, the distance between said opposing indentations being less than the distance between said first and second edges of said trapdoor, so that both said first and second edges of said trapdoor engage the respective said indentation when said trapdoor is moved to said first closed position to seal said trapdoor and prevent the escape of crop material between said first and second edges and the respective said sidewall during the passage of crop material over said bottom surface.

2. The apparatus according to claim 1 wherein the trapdoor further comprising a pair of opposing edges, the edges being rounded in shape to tightly fit against the indentation to form tangentially contacting surfaces which effect a seal with the inner surfaces to prevent the loss of crop material when the trapdoor is in the first closed position.

3. In a combine for harvesting crop material from a field having:
 (a) a mobile frame;
 (b) processing apparatus mounted on the frame to successively thresh, separate and clean crop material gathered from the field;
 (c) a harvesting attachment to gather crop material from the field and convey it towards the processing apparatus; and
 (d) an infeed housing with two opposing sidewalls and a bottom surface attached to the harvesting attachment and the frame effective to convey crop material received from the attachment to the processing apparatus, the infeed housing further having a trapdoor for ejecting foreign objects with first and second opposing edges adjacent the opposing sidewalls and moveable between a first closed position and a second open position, each opposing sidewall having an elongate indentation therein cooperative with the first and second opposing edges when the trapdoor is in the closed position to form a tight fitting wear resistant seal to prevent the escape of crop material from therebetween during the operation of the combine, the distance between said indentations being less than the distance between said first and second edges of said trapdoor, so that both said first and second edges engage the respective said indentation when said trapdoor is moved to said first closed position to form said tight fitting wear resistant seal without the utilization of a pliant material between said trapdoor and said sidewalls.

4. The apparatus according to claim 3 wherein the first and second opposing edges are rounded with a predetermined radius.

5. The apparatus according to claim 4 wherein each indentation has an inner surface and an outer surface, the inner surface having a second predetermined radius adjacent the corresponding rounded edge of the trapdoor such that a tangential contacting surface is established therebetween when the trapdoor is in the closed position.

* * * * *